United States Patent
Hegna et al.

(10) Patent No.: US 10,838,095 B2
(45) Date of Patent: Nov. 17, 2020

(54) WAVEFIELD DEGHOSTING OF SEISMIC DATA RECORDED USING MULTIPLE SEISMIC SOURCES AT DIFFERENT WATER DEPTHS

(75) Inventors: Stian Hegna, Høvik (NO); Gregory Ernest Parkes, Corsham (GB)

(73) Assignee: PGS GEOPHYSICAL AS, Oslo (NO)

( * ) Notice: Subject to any disclaimer, the term of this patent is extended or adjusted under 35 U.S.C. 154(b) by 0 days.

(21) Appl. No.: 12/806,098

(22) Filed: Aug. 5, 2010

(65) Prior Publication Data

US 2012/0033526 A1    Feb. 9, 2012

(51) Int. Cl.
*G01V 1/06*    (2006.01)
*G01V 1/36*    (2006.01)
*G01V 1/38*    (2006.01)
*G01V 1/00*    (2006.01)

(52) U.S. Cl.
CPC ............ *G01V 1/364* (2013.01); *G01V 1/3808* (2013.01); *G01V 1/005* (2013.01); *G01V 2210/21* (2013.01); *G01V 2210/56* (2013.01)

(58) Field of Classification Search
USPC .................................................. 367/21, 24
See application file for complete search history.

(56) References Cited

U.S. PATENT DOCUMENTS

| | | | |
|---|---|---|---|
| 4,658,384 A * | 4/1987 | Dragoset et al. | ............... 367/23 |
| 4,693,336 A | 9/1987 | Newman | |
| 4,737,938 A | 4/1988 | Grau | |
| 5,717,655 A | 2/1998 | Beasley | |
| 5,924,049 A | 7/1999 | Beasley et al. | |
| 6,545,944 B2 | 4/2003 | De Kok | |
| 6,882,938 B2 | 4/2005 | Vaage et al. | |
| 6,906,981 B2 | 6/2005 | Vaage | |
| 6,961,284 B2 | 11/2005 | Moldoveanu | |
| 7,123,543 B2 * | 10/2006 | Vaage et al. | .................... 367/24 |
| 7,218,572 B2 | 5/2007 | Parkes | |

(Continued)

FOREIGN PATENT DOCUMENTS

MY    141415    7/2010
RU    2282877    8/2006

OTHER PUBLICATIONS

L. I. Popova, Eurasian Search Report, dated Jan. 19, 2012.
(Continued)

*Primary Examiner* — James R Hulka

(57) ABSTRACT

Seismic data are acquired by actuating a first source at a first time and one or more additional seismic sources each with their own characteristic times with respect to a time of signal recording, the sources substantially collocated and at different depths. A first wavefield is determined that would occur if the first source were actuated at a selected time with respect to an initiation time of the recordings and being time adjusted for the water depth. One or more additional wavefields are determined that would occur if the one or more additional sources were each actuated at said selected time with respect to said initiation time, and being time adjusted for water depths of the one or more additional sources. The first wavefield and the one or more additional wavefields are combined to determine a deghosted source wavefield corresponding to actuation of a single seismic energy source.

9 Claims, 9 Drawing Sheets

(56) References Cited

U.S. PATENT DOCUMENTS

| | | | | |
|---|---|---|---|---|
| 7,489,590 | B2* | 2/2009 | Grion | G01V 1/364 367/21 |
| 7,684,281 | B2 | 3/2010 | Vaage et al. | |
| 8,345,510 | B2* | 1/2013 | Hegna | G01V 1/36 367/119 |
| 2005/0013194 | A1* | 1/2005 | Vaage et al. | 367/24 |
| 2006/1053004 | | 7/2006 | Berg | |
| 2006/0227660 | A1* | 10/2006 | Grion | 367/24 |
| 2006/0250891 | A1* | 11/2006 | Krohn | 367/38 |
| 2008/0019215 | A1* | 1/2008 | Robertsson et al. | 367/19 |
| 2008/0049551 | A1* | 2/2008 | Muyzert et al. | 367/24 |
| 2008/0186804 | A1* | 8/2008 | Amundsen et al. | 367/24 |
| 2009/0067285 | A1* | 3/2009 | Robertsson et al. | 367/24 |
| 2009/0097357 | A1* | 4/2009 | Robertsson et al. | 367/43 |
| 2009/0245022 | A1* | 10/2009 | Dragoset, Jr. | 367/24 |
| 2009/0323469 | A1 | 12/2009 | Beasley | |
| 2010/0008184 | A1 | 1/2010 | Hegna et al. | |
| 2010/0039891 | A1* | 2/2010 | Cambois | G01V 1/36 367/24 |
| 2010/0039894 | A1 | 2/2010 | Abma | |

OTHER PUBLICATIONS

Posthumus, B.J., 1993, "Deghosting of twin streamer configuration", Geophysical Prospecting, vol. 41. p. 267-286.
Egan, Mark et al, 2007, "Full deghosting of OBC data with over/under source acquisition", SEG Ann. Mtg., Exp. Abstr., p. 31-35.
Ziolkowski, A. et al., 1982, "The signature of an air gun array: Computation from near-field measurements including interactions", Geophysics, vol. 47, No. 10, p. 1413-1421.
Extended European Search Report, dated Jul. 6, 2013.
Mark Egan, et al., "Full deghosting of OBC data with over/under source acquisition", SEG/San Antonio 2007 Annual Meeting, pp. 31-35, 2007 (XP-002697334).
B. J. Posthumus, "Deghosting using a twin streamer configuration"; Geophysical Prospecting vol. 41, No. 3, pp. 267-286, Apr. 1, 1993 (XP-002531261).
A. Kemal Özdemir, et al., "Optimized deghosting of over/under towed-streamer data in the presence of noise", The Leading Edge, vol. 27, No. 2, pp. 190-192, 194-198, Feb. 1, 2008 (XP-001510182).

* cited by examiner

WAVEFIELD DEGHOSTING OF SEISMIC DATA RECORDED USING MULTIPLE SEISMIC SOURCES AT DIFFERENT WATER DEPTHS

CROSS-REFERENCE TO RELATED APPLICATIONS

Not applicable.

STATEMENT REGARDING FEDERALLY SPONSORED RESEARCH OR DEVELOPMENT

Not applicable.

BACKGROUND OF THE INVENTION

Field of the Invention

The invention relates generally to the field of marine seismic data acquisition and processing. More specifically, the invention relates to methods for reducing the effect of water surface reflections on the energy emitted by marine seismic energy sources.

Background Art

In seismic exploration, seismic data are acquired by imparting acoustic energy into the Earth near its surface, and detecting acoustic energy that is reflected from boundaries between different layers of subsurface rock formations. Acoustic energy is reflected when there is a difference in acoustic impedance between adjacent layers to a boundary. Signals representing the detected acoustic energy are interpreted to infer structures and composition of the subsurface rock formation structures.

In marine seismic exploration, a seismic energy source, such as an air gun, or air gun array, is typically used to impart the acoustic energy into the formations below the bottom of the water. The air gun or array is actuated at a selected depth in the water, typically while the air gun or array is towed by a vessel. The same or a different vessel tows one or more seismic sensor cables, called "streamers", in the water. Generally the streamer extends behind the vessel along the direction in which the streamer is towed. Typically, a streamer includes a plurality of hydrophones disposed on the cable at spaced apart, known positions along the cable. Hydrophones, as is known in the art, are sensors that generate an optical or electrical signal corresponding to the pressure of the water or the time gradient (dp/dt) of pressure in the water. The vessel that tows the one or more streamers typically includes recording equipment to make a record, indexed with respect to time, of the signals generated by the hydrophones in response to the detected acoustic energy. The record of signals is processed, as previously explained, to infer structures of and compositions of the earth formations below the locations at which the seismic survey is performed.

Marine seismic data include an effect that limits the accuracy of inferring the structure and composition of the subsurface rock formations. This effect, known as source ghosting, arises because water has a substantially different density and propagation velocity of pressure waves than the air above the water surface. Source ghosting can be understood as follows. When the air gun or air gun array is actuated, acoustic energy radiates generally outwardly from the air gun or array. Half of the energy travels downwardly where it passes through the water bottom and into the subsurface rock formations. The other half of the acoustic energy travels upwardly from the gun or array and most of this energy reflects from the water surface, whereupon it travels downwardly. The reflected acoustic energy will be delayed in time and also be shifted in phase by about 180 degrees from the directly downward propagating acoustic energy. The surface-reflected, downwardly traveling acoustic energy is commonly known as a "ghost" signal. The ghost signal interferes with the directly downward propagating wavefield causing constructive interference in some parts of the frequency band and destructive interference in other parts of the frequency band. The destructive interference causes a sequence of notches in the spectrum, equally spaced in frequency including a notch at zero frequency (0 Hz). The frequencies of these notches in the detected acoustic signal are related to the depth at which the air gun or gun array is disposed, as is well known in the art. The effect of the source ghosting is typically referred to as the "source ghost."

The seismic energy emitted by the source is attenuated with propagation distance because of geometrical spreading, transmission loss, and absorption. The absorption of higher-frequency energy at a greater rate than lower-frequency energy is well known in the art. Therefore, for deep penetration, it is desirable to maximize the energy emitted by the source at lower frequencies. Since the source ghost causes a notch in the recorded signal at 0 Hz, the ghost is limiting the energy in the low-frequency end of the signal. The amount of energy in the low frequencies may be improved by towing the sources at a greater depth. However, this causes the ghost notches in the spectrum to occur at lower frequencies, and hence limits the high frequency parts of the spectrum needed for high resolution imaging of shallower targets. Also, when using air gun(s) as a seismic energy source, the fundamental frequency of the gun(s) increases with increasing depth. Hence, the increase in energy in the low frequency end when towing the air-gun(s) deeper due to the source ghost, is counteracted by the increase in fundamental frequency of the air-gun(s).

A known way of increasing the signal level emitted by the source across the bandwidth when using air-gun(s) is to increase the total volume of air released by the air-gun(s) and/or to increase the operating pressure. However, the maximum volume of air that can be released for every shot and the maximum air pressure is limited by the available source equipment and air-supply system. To change the maximum volumes and pressure can be very expensive and time consuming. Also, increasing the source strength may have an impact on marine life. Therefore, maximizing the use of the signal emitted by the source may be of great value and reduce the need to increase the energy level emitted by the source. By extracting the upward (ghosted) and the directly downward propagating wavefields from the source, the effects of the source ghost are eliminated and the signal around all ghost notches is boosted, including the signal in the lower frequencies near the notch at 0 Hz. These separated wavefields can also be time shifted to the sea-surface or a common reference depth using the known source depth(s). Then, by applying a 180 phase shift to the ghosted signal, the separated wavefields can be summed together constructively. In this way almost all energy emitted by the source is utilized.

A technique known in the art for extracting the source ghost is described in M. Egan et al., *Full deghosting of OBC data with over/under source acquisition*, 2007 Annual Meeting, San Antonio, Tex., Society of Exploration Geophysicists. The technique described in the Egan et al. publication includes towing a first seismic energy source at a first depth in the water, and towing a second seismic energy source at a second depth in the water. The sources are air guns or arrays thereof. The second source is also towed at a selected distance behind the first source. The first source is actuated and seismic signals are recorded corresponding to actuations of the first source. After the towing vessel has moved so that the second source is disposed at substantially the same geodetic position as the first source was at the time of its actuation, the second source is actuated and seismic signals are again recorded. A "deghosted" seismic data set is obtained using the technique described more fully in the Egan et al. publication.

One of the main issues with the over/under source technique described in the Egan et al. publication referred to above is that the number of shot positions is half compared to conventional source actuation techniques, causing the fold coverage to be half. Another issue with this technique, if the seismic receivers are towed behind a vessel and hence moving from shot to shot, is that the receivers have moved a considerable distance between when the sources at different depths are actuated. To maintain the number of shot positions and fold coverage as in conventional marine seismic acquisition, and to minimize the difference in receiver positions when the sources at different depths are actuated, it is desirable to have a method for extracting the source ghost that allows sources towed at different depths to be actuated during the recording of each shot record.

It is also known in the art to use two or more streamers towed at different depths to obtain a recorded signal that is substantially free of ghosting caused by water surface reflections proximate the streamers. See, for example, Posthumus, B. [1993] *Deghosting of twin streamer configuration*, Geophysical Prospecting, vol. 41, pp. 267-286. Direct adaptation of the Posthumus method to deghosting "over/under" sources, where sources at different depths are actuated with time delays within the same seismic records has proven to be inaccurate.

Accordingly, there continues to be a need for improved techniques for reducing the effects of source ghosting on marine seismic data.

SUMMARY OF THE INVENTION

In one embodiment, the invention is a method for determining a deghosted marine seismic energy source wavefield from signal recordings of seismic data acquired by actuating a first seismic source at a first time and one or more additional seismic sources at their own characteristic times with respect to an index time of the signal recordings, wherein the sources are substantially collocated and disposed at different depths in a body of water. A first wavefield is determined from the signal recordings that would occur if the first source was actuated at a selected time with respect to an initiation time of the signal recordings. The first wavefield is time adjusted with respect to the depth in the water of the first source. One or more additional wavefields are determined from the signal recordings that would occur if the one or more additional sources were each actuated at said selected time with respect to said initiation time of the signal recordings. The one or more additional wavefields are time adjusted with respect to the depths in the water of the one or more additional sources. The first wavefield is combined with the one or more additional wavefields to determine a deghosted wavefield corresponding to actuation of a single seismic source.

Other aspects and advantages of the invention will be apparent from the following description and the appended claims.

BRIEF DESCRIPTION OF THE DRAWINGS

The invention and its advantages may be more easily understood by reference to the following detailed description and the attached drawings, in which.

While the invention will be described in connection with its preferred embodiments, it will be understood that the invention is not limited to these. On the contrary, the invention is intended to cover all alternatives, modifications, and equivalents that may be included within the scope of the invention, as defined by the appended claims.

DETAILED DESCRIPTION

Figure 1:
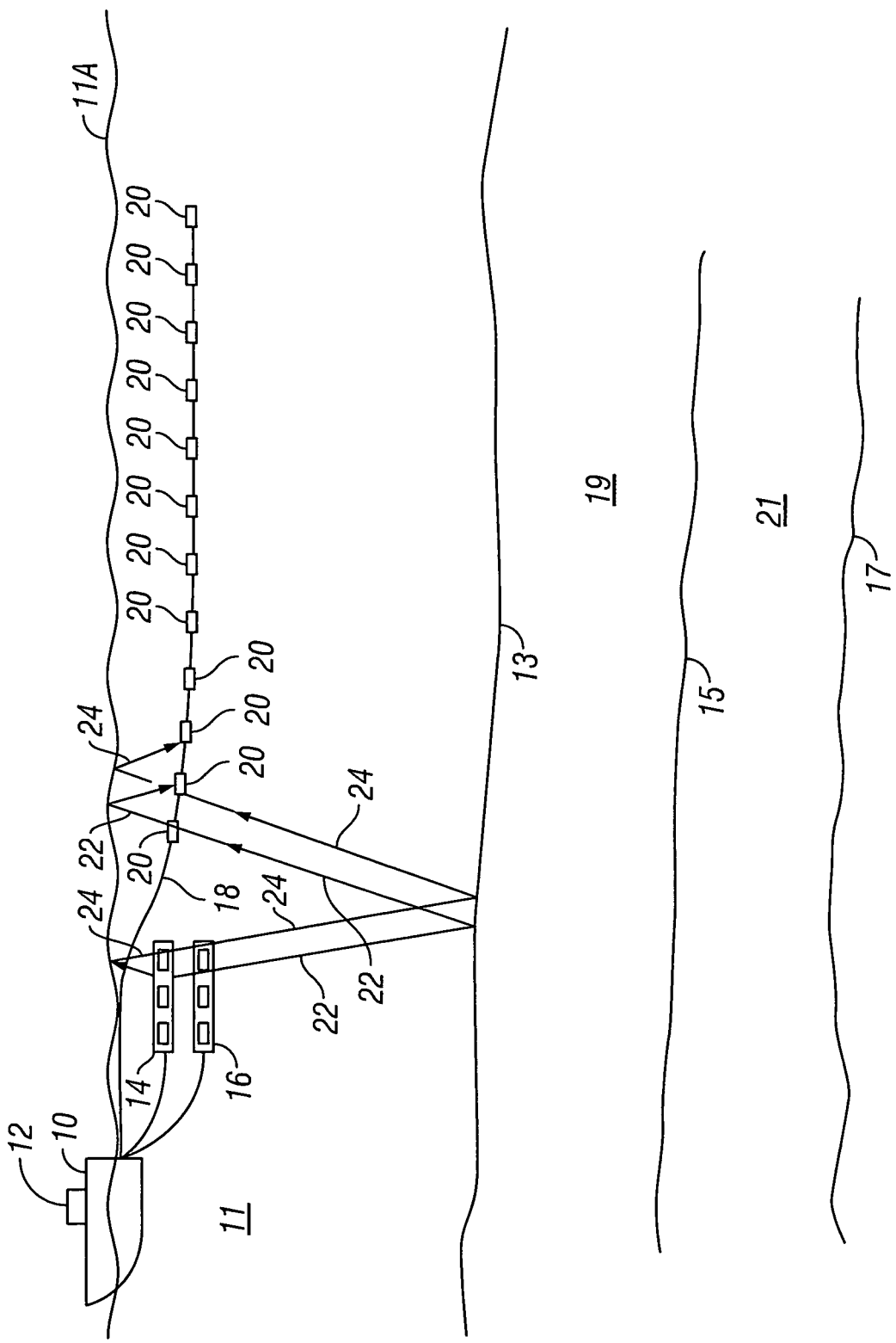
FIG. 1 shows acquiring seismic data in cross section to show an example arrangement of seismic energy sources.

FIG. 1 shows in cross sectional view an example arrangement for acquiring seismic data according to the invention. A seismic survey vessel 10 moves along the surface 11A of a body of water 11 such as a lake or the ocean. The vessel 10 typically includes equipment shown generally at 12 and referred to for convenience as a "recording system". The recording system 12 may include devices (none shown separately) for selectively actuating seismic energy sources 14, 16 (explained below), for recording the signals generated by sensors or receivers 20 (explained below) in response to seismic energy imparted into the water 11 (by the sources 14, 16) and thereby into rock formations 19, 21 below the water bottom 13, and for determining geodetic position of the vessel 10, the seismic energy sources 14, 16 and each of a plurality of seismic sensors or receivers 20 at any time.

The vessel 10 is shown towing two seismic energy sources 14, 16, for purposes of illustrative clarity only. The invention is intended to be employed with two or more seismic sources and is not restricted to only two sources. The seismic energy sources 14, 16 can be any type of marine energy source including, but not limited to, air guns and water guns, or arrays of such energy sources. In the example shown in FIG. 1, the sources 14, 16 are towed at substantially the same distance behind the vessel 10 and at different depths in the water 11. Such an arrangement of the sources is referred to as "over/under." In other examples, the sources 14, 16 may be towed by a different vessel (not shown), or may be in a fixed position (provided that the depths are different as shown in FIG. 1). Therefore, having the survey vessel 10 tow the sources 14, 16 is not a limit on the scope of the present invention.

The vessel 10 is also shown towing a seismic streamer 18 having a plurality of longitudinally spaced apart seismic receivers 20 thereon. However, this invention is generally related to the seismic energy sources, and therefore may be used together with any type of seismic receiver arrangement. In different embodiments, the invention may be used with towed seismic streamers in any configuration, ocean bottom cables, sensors deployed in boreholes, etc., and with any type of receiving sensor, including, but not limited to, pressure sensors, pressure time gradient sensors, velocity sensors, accelerometers, etc., or any combination thereof.

At a selected time during operation of the acquisition system shown in FIG. 1, the acquisition system 12 actuates a first one of the seismic energy sources, e.g., source 14. The selected time may be indexed with respect to the start of recording of receiver responses or any other time reference related to signal recording time, and typically has a first selected delay from the start of recording. Energy from the first source 14 travels outwardly therefrom as shown at 22 and 24. Some of the energy travels downwardly, 22, where it is reflected at acoustic impedance boundaries, e.g., the water bottom 13 and at the boundaries 15, 17 between different rock formations 19, 21. Only the water bottom reflections are shown in FIG. 1 for clarity of the illustration. Up-going portions of the energy from the first source 14, shown as 24, are reflected from the water surface 11A as shown in FIG. 1. The recording system 12 is configured to actuate the second seismic energy source, e.g., source 16, at the end of a second time relative to the start of the seismic data recording, or, alternatively, after a selected time before or after the actuation of the first source 14. Energy travelling outwardly from the second source 16 moves along similar paths as the energy from the first source 14. In the present invention, the above described time delays are selected so that energy from both sources is detected by the receivers 20 in each data recording (called a shot record). It is expected that the time of actuating the sources at different depths may vary between shot records in a random, semi-random, or systematic manner.

Figure 2:
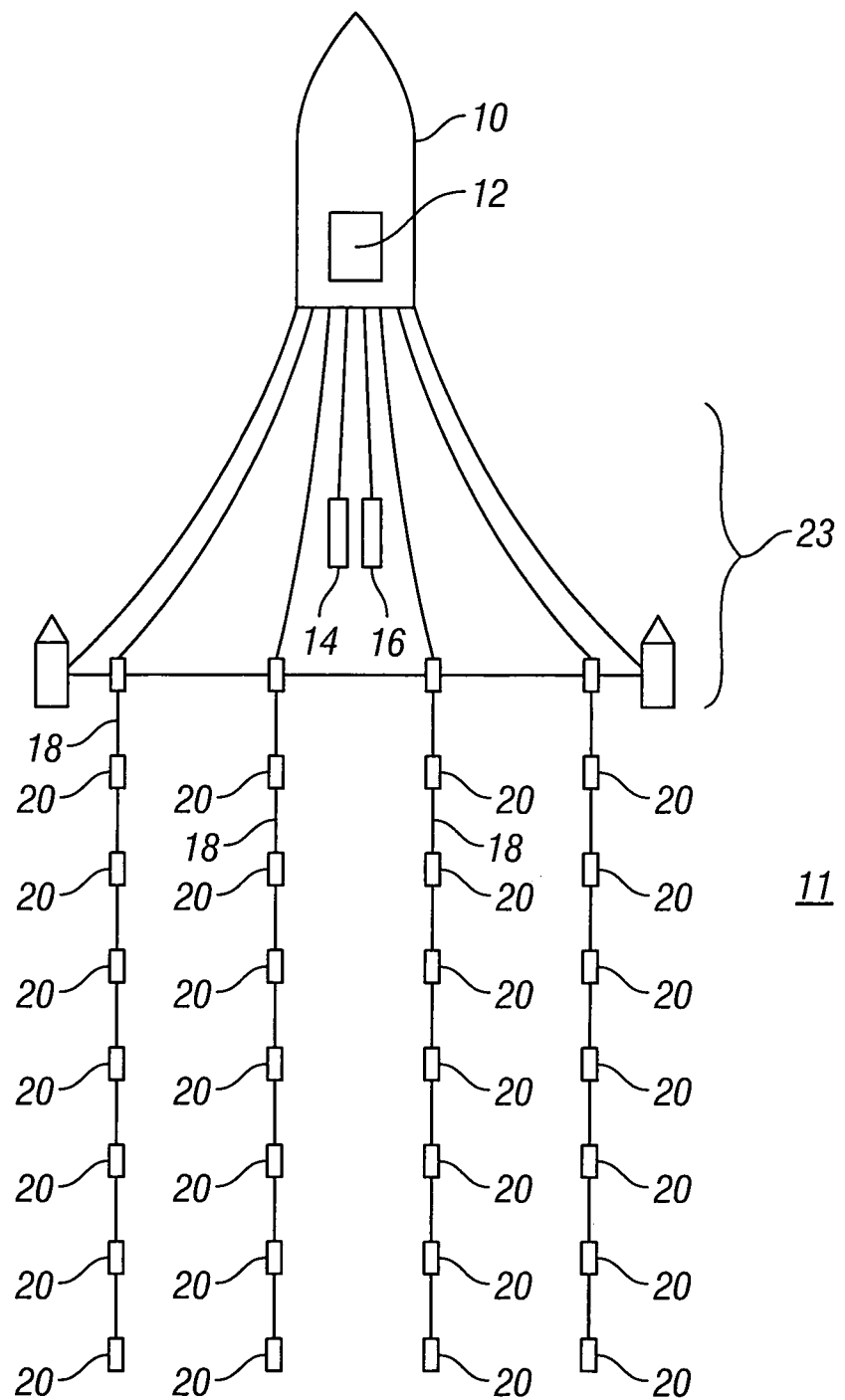
FIG. 2 shows a plan view of acquiring seismic data to show an example arrangement of seismic receiver streamers.

FIG. 2 shows the arrangement of FIG. 1 in plan view to illustrate towing a plurality of laterally spaced apart streamers 18. The streamers 18 can be maintained in their relative lateral and longitudinal positions with respect to the vessel 10 using towing equipment 23 of types well known in the art. Again, the vessel 10 is shown towing two seismic energy sources 14, 16, for purposes of illustrative clarity only. The invention is intended to be employed with two or more seismic sources and is not restricted to only two sources. What is also shown in FIG. 2 is that the first source 14 and the second source 16 may be laterally displaced (and/or longitudinally displaced in other embodiments) to avoid, in the case the sources 14, 16 are air guns or arrays thereof, having dispersed air in the water 11 from the first source 14 affect the upwardly traveling seismic energy from the second source 16, and vice versa. Lateral and/or longitudinal displacement is contemplated as being only a few meters, so that the sources 14, 16 provide energy equivalent to being that which would occur if the sources 14, 16 were in the same vertical plane and at the same longitudinal distance behind the vessel, or expressed differently, at essentially the same geodetic position. By avoiding having dispersed air above the sources when actuated, the effects of the water surface (11A in FIG. 1) on the energy emitted from each source 14, 16 will be, adjusted for water depth, substantially the same as the effect thereof on the other source 14, 16.

The source actuation and signal recording explained above may be repeated a plurality of times while the vessel 10, sources 14, 16 and streamers 18 move through the water 11. As explained above, each shot record will include, for each receiver 20, signals corresponding to the seismic energy produced by both the first source 14 and the second source 16.

FIGS. 1 and 2 illustrate two sources each operating at a different depth. This is only for illustration purposes. The method is not limited to two sources operating at different depths, but can include any multiplicity of sources operating at different depths.

The seismic data obtained in performing a seismic survey, representative of earth's subsurface, are processed to yield information relating to the geologic structure and properties of the subsurface earth formations in the area being surveyed. The processed seismic data are processed for display and analysis of potential hydrocarbon content of these subterranean formations. The goal of seismic data processing is to extract from the seismic data as much information as possible regarding the subterranean formations in order to adequately image the geologic subsurface. In order to identify locations in the earth's subsurface where there is a probability for finding petroleum accumulations, large sums of money are expended in gathering, processing, and interpreting seismic data. The process of constructing the reflector surfaces defining the subterranean earth layers of interest from the recorded seismic data provides an image of the earth in depth or time.

The image of the structure of the earth's subsurface is produced in order to enable an interpreter to select locations with the greatest probability of having petroleum accumulations. To verify the presence of petroleum, a well must be drilled. Drilling wells to determine whether petroleum deposits are present or not, is an extremely expensive and time-consuming undertaking. For that reason, there is a continuing need to improve the processing and display of the seismic data, so as to produce an image of the structure of the earth's subsurface that will improve the ability of an interpreter, whether the interpretation is made by a computer or a human, to assess the probability that an accumulation of petroleum exists at a particular location in the earth's subsurface. The processing and display of acquired seismic data facilitates more accurate decisions on whether and where to drill, and thereby reduces the risk of drilling dry holes.

Having explained an acquisition technique that may be used with the present invention, a method of the invention for wavefield decomposition will now be explained. The following exemplary embodiment employs two sources at two depths for illustrative simplicity only. The invention encompasses the use of any number of sources at different depths.

First, in the time domain, ghost operators $g_n$ (functions that determine the ghost signature of the respective seismic sources) may be defined for each source as follows. For the first seismic source, $$g_1(t) = \delta(t) - \delta\left(t - 2d_1 \frac{\cos(\alpha)}{v}\right),$$

and for the second seismic source, $$g_2(t) = \delta(t) - \delta\left(t - 2d_2 \frac{\cos(\alpha)}{v}\right).$$

In the foregoing expressions, $d_1$ is the operating depth of the first source; $d_2$ is the operating depth of the second source; $\alpha$ is the emission angle of the energy propagation from the source, relative to vertical; v is acoustic velocity in the water, which is about 1500 m/s; and $\delta$ is the Dirac delta operator.

Let w(t) represent the wavefield that would be recorded at a selected receiver from the first source if $t_1=0$ seconds (at the initiation of recording), if there were no source ghost reflection, and if the source signature was a perfect spike. The actually recorded signal r(t) resulting from actuation of the first source being actuated at an actual time after recording is initiated $t=t_1$ and the second source actuated at time $t=t_2$ can be expressed as:

$$r(t) = w(t - t_1) * s_1(t) * g_1(t) + \qquad (1)$$
$$w\left(t - \left[t_2 - (d_2 - d_1)\frac{\cos(\alpha)}{v}\right]\right) * s_2(t) * g_2(t) + n(t),$$

where n(t) represents noise, $s_1(t)$ and $s_2(t)$ represents the ghost-free signatures of the first and the second sources, respectively, and (*) represents time-domain convolution.

Shifting r(t) earlier in time by $t_1$ seconds in Equation (1), and therefore correcting it for the actual actuation time of the first source with respect to initiation of recording (time t=0) in the shot record provides the expression for a first time-corrected signal $o_1(t)$:

$$o_1(t) = r(t + t_1) \qquad (2a)$$
$$= w(t - t_1 + t_1) * s_1(t) * g_1(t) +$$
$$w\left(t + t_1 - \left[t_2 - (d_2 - d_1)\frac{\cos(\alpha)}{v}\right]\right) * s_2(t) * g_2(t) + n(t + t_1)$$
$$= w(t) * s_1(t) * g_1(t) + w\left(t - \left[t_2 - t_1 - (d_2 - d_1)\frac{\cos(\alpha)}{v}\right]\right) *$$
$$s_2(t) * g_2(t) + n(t + t_1).$$

Transforming Equation (2a) into the frequency domain provides the following expression:

$$O_1(\omega) = W(\omega)S_1(\omega)G_1(\omega) + W(\omega)\exp(-i\omega\Delta T_2)S_2(\omega)G_2(\omega) + N_i(\omega), \qquad (2b)$$

wherein $N_1(\omega)$ is the transform of $n(t+t_1)$ and $$\Delta T_2 = t_2 - t_1 - (d_2 - d_1)\frac{\cos(\alpha)}{v}.$$

In Equation (2b) and further expressions, capitalization of each variable represents its transformation from the time domain to the frequency domain.

Shifting r(t) earlier in time by $t_2 - \{(d_2-d_1)\cos(\alpha)/v\}$ seconds in Equation (1), and therefore correcting it for the actuation time of the second source and compensating for its being closer to the reflectors than the first source results in the following expression for a second time-corrected signal $o_2(t)$:

$$o_2(t) = r\left(t + t_2 - (d_2 - d_1)\frac{\cos(\alpha)}{v}\right) \qquad (3a)$$
$$= w\left(t - t_1 + t_2 - (d_2 - d_1)\frac{\cos(\alpha)}{v}\right) * s_1(t) * g_1(t) +$$
$$w\left(t - \left[t_2 - (d_2 - d_1)\frac{\cos(\alpha)}{v}\right] + \left[t_2 - (d_2 - d_1)\frac{\cos(\alpha)}{v}\right]\right) +$$
$$s_2(t) * g_2(t) + n\left(t + t_2 - (d_2 - d_1)\frac{\cos(\alpha)}{v}\right)$$
$$= w\left(t - \left[t_1 - t_2 + (d_2 - d_1)\frac{\cos(\alpha)}{v}\right]\right) * s_1(t) * g_1(t) +$$
$$w(t) * s_2(t) * g_2(t) + n\left(t + t_2 - (d_2 - d_1)\frac{\cos(\alpha)}{v}\right).$$

Transforming Equation (3a) to the frequency domain provides the expression:

$$O_2(\omega) = W(\omega)\exp(-i\omega\Delta T_1)S_1(\omega)G_1(\omega) + W(\omega)S_2(\omega)G_2(\omega) + N_2(\omega), \qquad (3b)$$

wherein $N_2(\omega)$ is the transform of $$n\left(t + \left[t_2 - (d_2 - d_1)\frac{\cos(\alpha)}{v}\right]\right) \text{ and}$$
$$\Delta T_1 = t_1 - t_2 + (d_2 - d_1)\frac{\cos(\alpha)}{v}.$$

If two copies (as illustrated here, although more copies could be made) of the recorded wavefields are made, and $O_1(\omega)$ is defined as the recorded data corrected for the actuation time of the first source, and $O_2(\omega)$ is defined as the recorded data corrected for the actuation time of the second source (explained above), and both recordings are corrected for the small difference between arrival times due to the different operating depths of each of the two sources, the result can expressed as explained above:

$$O_1(\omega) = W(\omega)S_1(\omega)G_1(\omega) + W(\omega)S_2(\omega)G_2(\omega)\exp(-i\omega\Delta T_2) + N_1(\omega) \qquad (4a)$$

and $$O_2(\omega) = W(\omega)S_1(\omega)G_1(\omega)\exp(-i\omega\Delta T_1) + W(\omega)S_2(\omega)G_2(\omega) + N_2(\omega), \qquad (4b)$$

where $\Delta T_2$ is the actuation time of the second source minus the actuation time of the first source, plus the time difference caused by the different operating depths for the sources, and $\Delta T_1$ is similarly the actuation time of the first source minus the actuation time of the second source, plus the time difference caused by different source operating depths. In essence, Equation (4a) represents the time corrected first source data and can be described as the wavefield from the first source plus the wavefield from the second source with a time delay depending on the difference in actuation times between the two sources and the difference in source depths, plus noise. Equation (4b) represents the time corrected second source recorded data in a similar way.

By multiplying Equations (4a) and (4b) with the complex conjugate of the ghost functions for the respective source depths, the results are the following expressions:

$$[O_1(\omega) - N_1(\omega)]G_1(\omega)^* = \qquad (5a)$$
$$W(\omega)S_1(\omega)|G_1(\omega)|^2 + W(\omega)S_2(\omega)G_1(\omega)^*G_2(\omega)\exp(-i\omega\Delta T_2)$$

and $$[O_2(\omega) - N_2(\omega)]G_2(\omega)^* = \qquad (5b)$$
$$W(\omega)S_2(\omega)|G_2(\omega)|^2 + W(\omega)S_2(\omega)G_2(\omega)^*G_1(\omega)\exp(-i\omega\Delta T_1),$$

wherein * represents the complex conjugate of the respective ghost operators in the frequency domain.

Adding Equations (5a) and (5b) provides the following expression:

$$[O_1(\omega) - N_1(\omega)]G_1(\omega)^* + [O_2(\omega) - N_2(\omega)]G_2(\omega)^* = \qquad (6)$$
$$W(\omega)S_1(\omega)|G_1(\omega)|^2 + W(\omega)S_2(\omega)G_1(\omega)^*G_2(\omega)\exp(-i\omega\Delta T_2) +$$
$$W(\omega)S_2(\omega)|G_2(\omega)|^2 + W(\omega)S_1(\omega)G_2(\omega)^*G_1(\omega)\exp(-i\omega\Delta T_1) =$$
$$W(\omega)[S_1(\omega)|G_1(\omega)|^2 + S_2(\omega)G_1(\omega)^*G_2(\omega)\exp(-i\omega\Delta T_2) +$$
$$S_2(\omega)|G_2(\omega)|^2 + S_1(\omega)G_2(\omega)^*G_1(\omega)\exp(-i\omega\Delta T_1)].$$

From Equation (6), the following expression can be derived for calculating the source signature corrected, deghosted source wavefield:

$$W(\omega) = \qquad (7)$$
$$\frac{O_1(\omega)G_1(\omega)^* + O_2(\omega)G_2(\omega)^*}{A(\omega)} - \frac{N_1(\omega)G_1(\omega)^* + N_2(\omega)G_2(\omega)^*}{A(\omega)},$$

where
$$A(\omega) = S_1(\omega)|G_1(\omega)|^2 + S_2(\omega)|G_2(\omega)|^2 +$$
$$S_2(\omega)G_1(\omega)^*G_2(\omega)\exp(-i\omega\Delta T_2) +$$
$$S_1(\omega)G_2(\omega)^*G_1(\omega)\exp(-i\omega\Delta T_1).$$

The method proposed by Posthumus (referenced in the Background section herein) for deghosting using over/under receivers, rather than over/under sources actuated within the same seismic records at different times, uses the following expression to calculate the deghosted wavefield at the streamers.

$$W(\omega) = \qquad (8)$$
$$\frac{O_1(\omega)G_1(\omega)^* + O_2(\omega)G_2(\omega)^*}{|G_1(\omega)|^2 + |G_2(\omega)|^2} - \frac{N_1(\omega)G_1(\omega)^* + N_2(\omega)G_2(\omega)^*}{|G_1(\omega)|^2 + |G_2(\omega)|^2}.$$

Comparing Equation (7) with Equation (8), it is apparent that the two equations are very similar. The difference between the two equations is in the denominator, wherein calculating the source signature corrected deghosted source wavefield includes the ghost free source signatures, and two additional terms. Within the two additional terms, $G_1(\omega)G_2(\omega)^*$ and $G_2(\omega)G_1(\omega)^*$ are equivalent to the cross-correlation of the two ghost functions in the time domain, and $\exp(-i\omega\Delta T_1)$ and $\exp(-i\omega\Delta T_2)$ are time delay operators to correct for the difference between the actuation times and source operating depths ($\Delta T_1$ and $\Delta T_2$, as explained above). It has been determined that using the extra terms as explained above can substantially reduce error in signal decomposition as contrasted with using the Posthumus method directly for over/under sources actuated to be recorded in the same shot record. In addition, unless the two (or more) sources operated at different depths are specifically designed to be close to identical, the source signatures need to be included in the expression to account for the differences in the signatures as described in Equation (7).

Because these cross-correlated ghost functions are shifted forward and backward in time, the denominator will have peaks and notches in its spectrum related to the differences in actuation time between the two sources. The peaks and notches can potentially cause an amplification of noise in parts of the spectrum, especially toward the high and low frequency ends. Therefore, it is desirable to dampen or filter these two additional terms when calculating the deghosted wavefield. Equations (7) and (8) are similar except for these two additional terms in the denominator of Equation 7. Dampening the two additional terms in Equation (7) makes it possible to approach the result of applying Equation (8) to the over/under data where two sources are fired into the same records with different firing times. However, even if some band-pass filtering of the two additional terms in Equation (7) is needed to avoid amplifying noise towards the low and high ends of the spectrum, the errors introduced are very small, provided that the filtering is done in parts of the spectrum where the cross-correlation of two ghost functions has limited energy and/or in parts of the spectrum with limited seismic energy. Such a filtered version of Equation (7) can be expressed as:

$$W(\omega) \approx \qquad (9)$$
$$\frac{O_1(\omega)G_1(\omega)^* + O_2(\omega)G_2(\omega)^*}{B(\omega)} - \frac{N_1(\omega)G_1(\omega)^* + N_2(\omega)G_2(\omega)^*}{B(\omega)},$$

where
$$B(\omega) = S_1(\omega)|G_1(\omega)|^2 + S_2(\omega)|G_2(\omega)|^2 +$$
$$F(\omega)[S_2(\omega)G_1(\omega)^*G_2(\omega)\exp(-i\omega\Delta T_2) +$$
$$S_1(\omega)G_2(\omega)^*G_1(\omega)\exp(-i\omega\Delta T_1)],$$

and $F(\omega)$ is a band-pass filter. Equations (7) and (9) can readily be expanded for the cases of firing three or more sources at three or more depths into the same records with different time delays.

Because it is normally impossible to perfectly separate noise from signal, only the first part of the right hand side of Equations (7) or (9) would normally be used for calculating the source signature corrected, deghosted wavefield.

Note that embodiments of the invention illustrated above include determining cross-correlation functions of ghost operators of the first and one or more additional sources. In general, the method of the invention can be extended to any number of sources, each operating at a different water depth. Further, the signatures of the individual sources are accounted for.

Figure 3A:
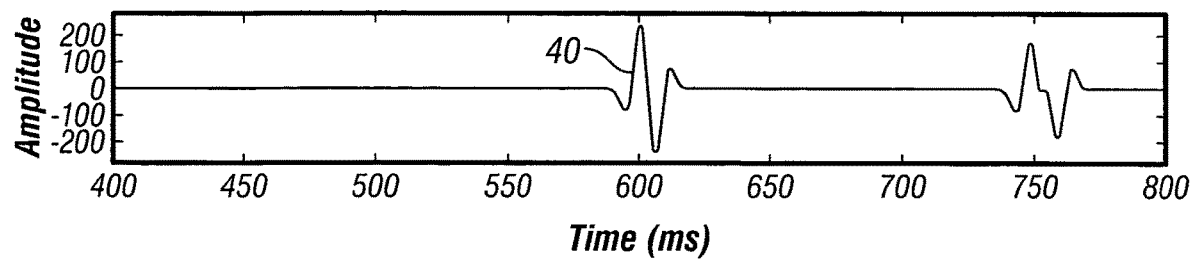
FIGS. 3A, 3B, and 3C show, respectively, examples of signatures of two sources operated at different times and at different depths, decomposition by a prior art technique (the method described in Posthumus [1993]), and decomposition by a method according to the invention.
Figure 3B:
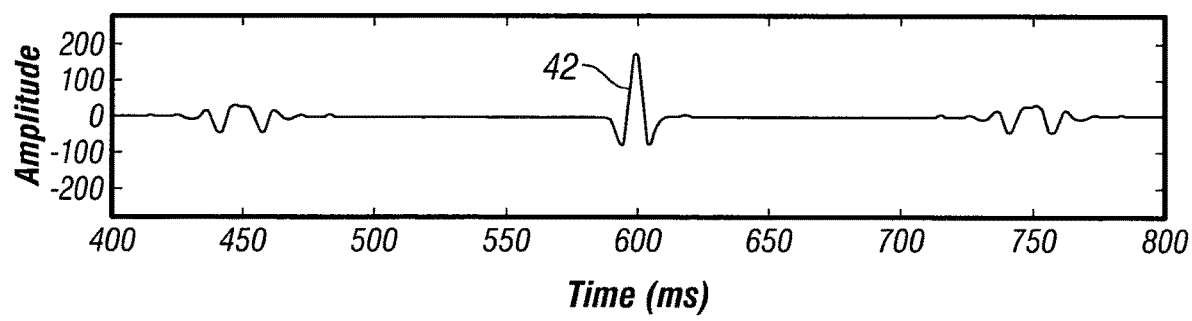
Figure 3C:
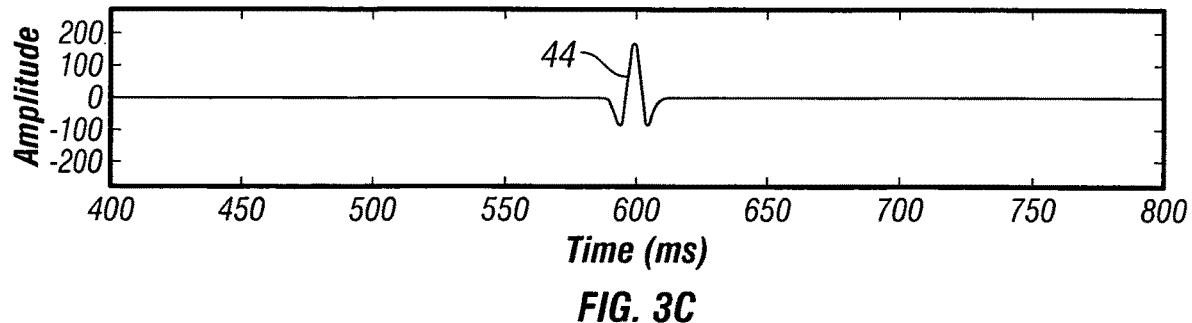

FIG. 3A shows examples of signatures of two sources operated at different times and at different depths in curve 40, where the ghost free signatures of the two sources are identical and therefore not taken into account. Curve 42 in FIG. 3B shows a deghosted source signature calculated by using decomposition according to the Posthumus technique. Errors in the source signature are clearly visible in curve 42 at both an earlier and later time than the deghosted signal. The time difference is related to the difference in actuation times of the sources at different depths, and the difference in arrival times due to the difference in source depths. Decomposition by a method according to the invention is shown at curve 44 in FIG. 3C. Very little error in the deghosted source signature is visible using the method according to the invention.

Figure 4B:
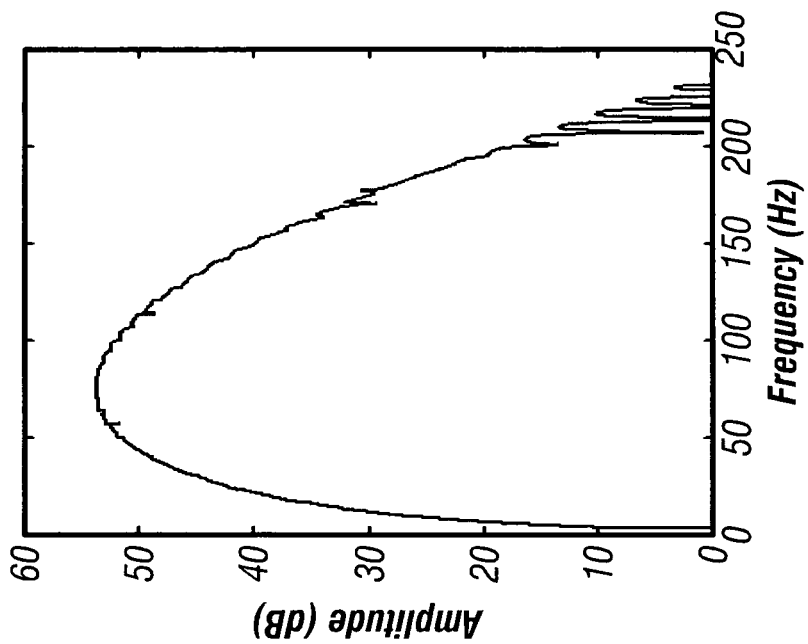
FIGS. 4A and 4B show, respectively, spectra of deghosted wavefields in FIG. 3 using the Posthumus method and the method of the invention.
Figure 4A:
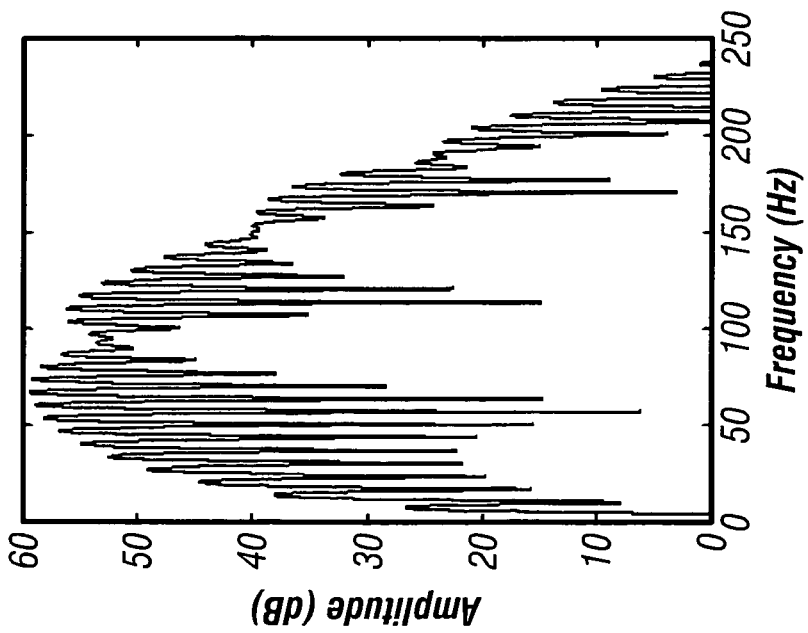

FIGS. 4A and 4B show, respectively, spectra of deghosted wavefields shown in FIG. 3 using the Posthumus method, and the method of the invention.

Figure 5B:
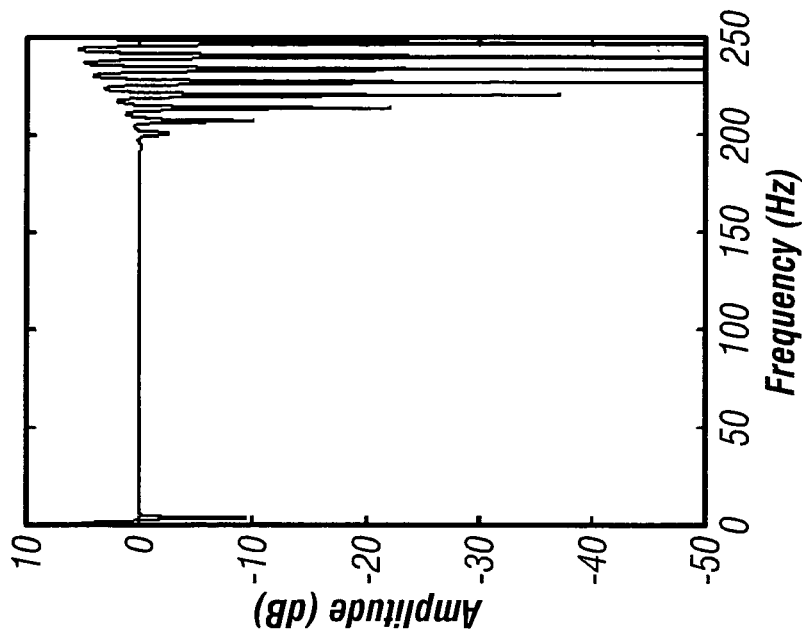
FIGS. 5A and 5B show, respectively, spectral error in deghosted wavefields when using the Posthumus method and the method of the invention.
Figure 5A:
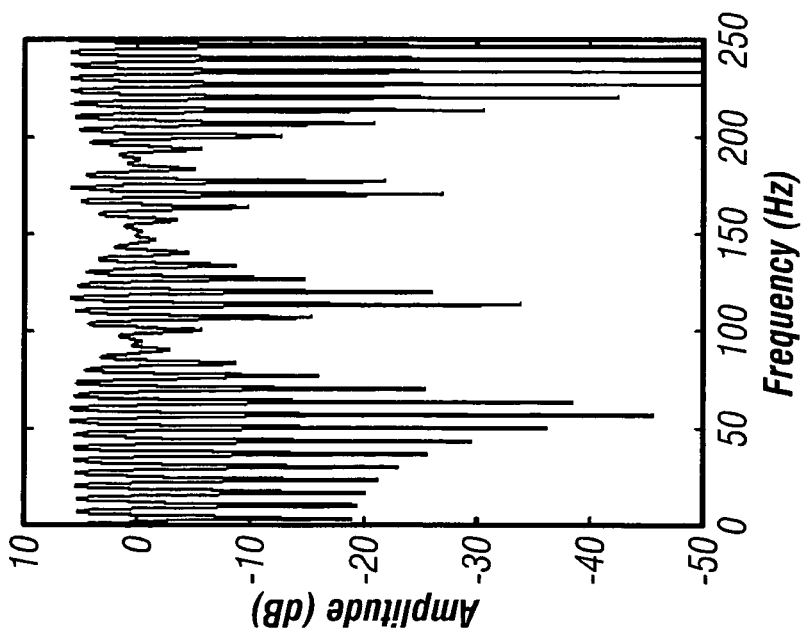

FIGS. 5A and 5B show, respectively, spectral error in the deghosted wavefields when using the Posthumus method and the method of the invention.

Figure 6B:
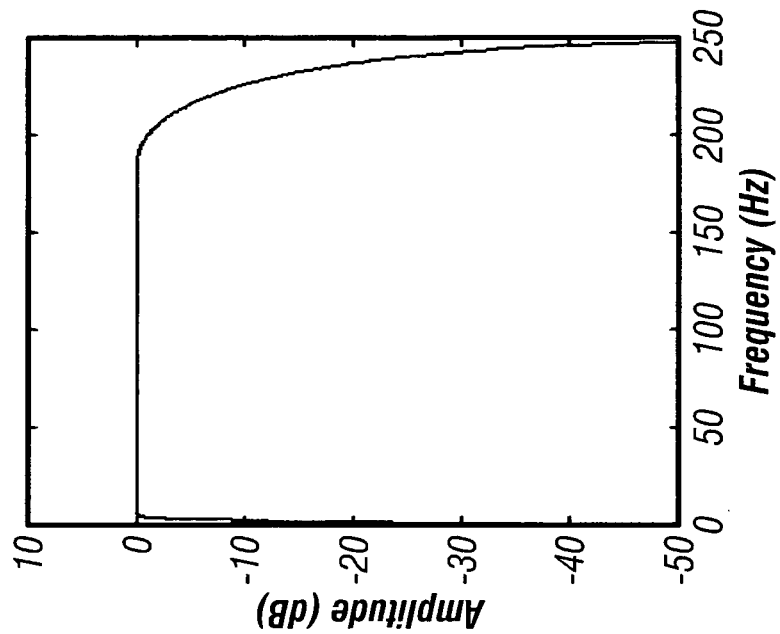
FIGS. 6A and 6B show, respectively, the spectrum of the unfiltered and exact denominator in an equation according to the method of the invention, and the spectrum of a band-pass filter applied to the two last terms in such denominator.
Figure 6A:
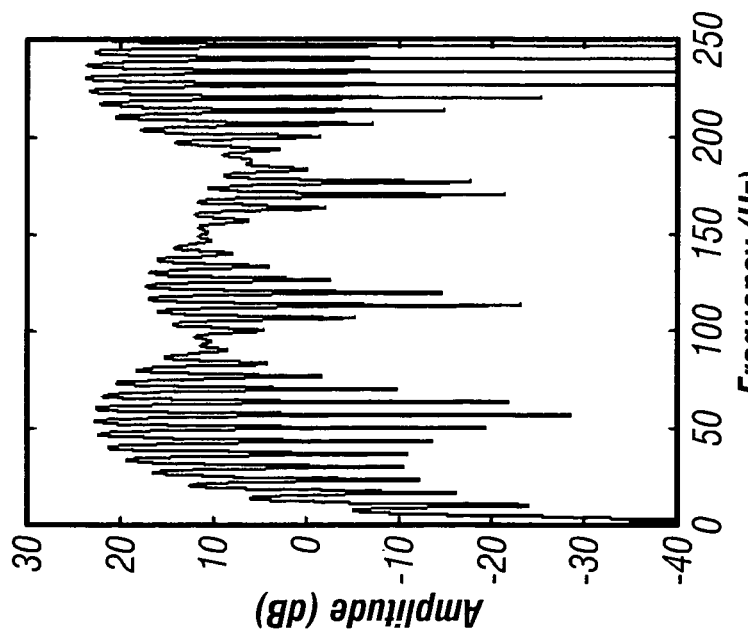

FIGS. 6A and 6B show, respectively, the spectrum of the unfiltered and exact denominator in an equation (e.g., Equation (7)) according to the method of the invention, and the spectrum of a band-pass filter applied to the two last terms in such denominator as explained above.

Figure 7B:
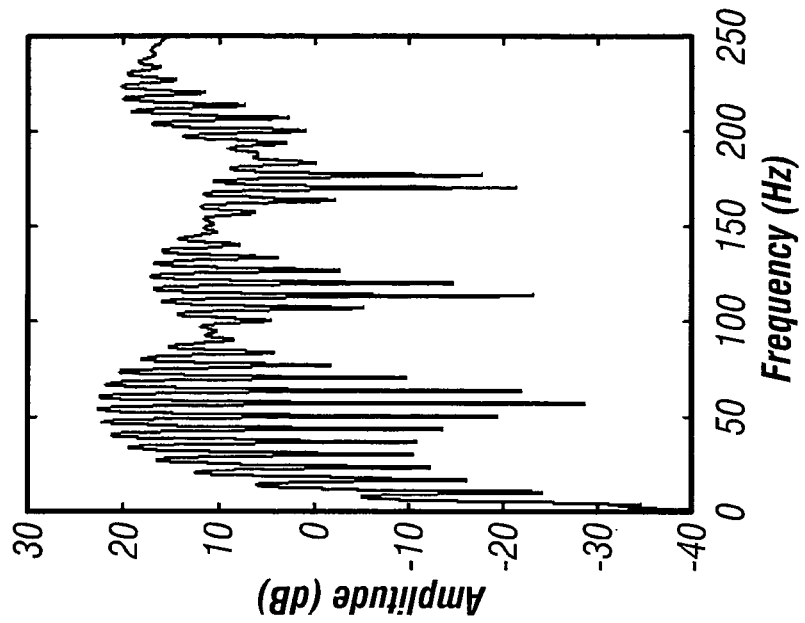
FIGS. 7A and 7B show, respectively, the spectrum of the denominator in the equations used in the Posthumus method, and the spectrum of the band-pass filtered version of the denominator in the method of the invention.
Figure 7A:
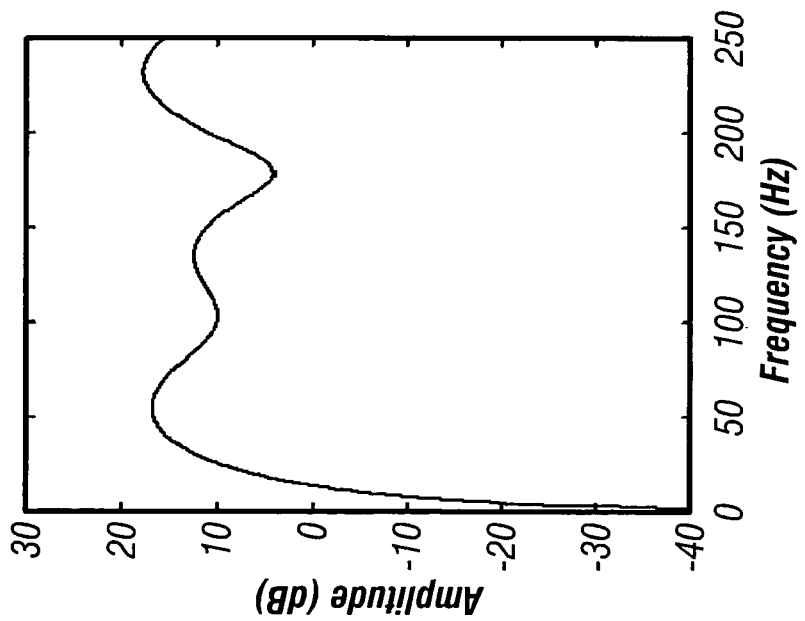

FIGS. 7A and 7B show, respectively, the spectrum of the denominator in the equations used in the Posthumus method, and the spectrum of the band-pass filtered version of the denominator in the method of the invention.

Figure 8B:
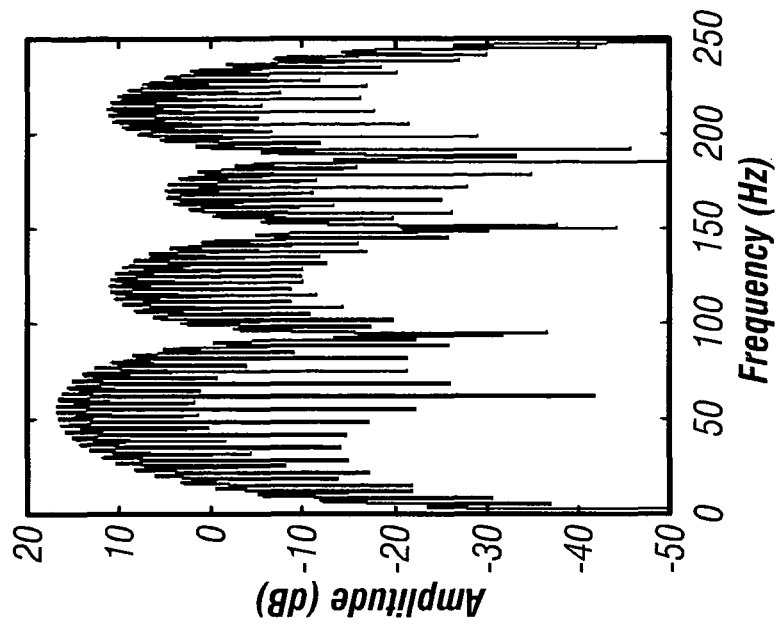
FIGS. 8A and 8B show, respectively, the spectrum of the last two terms of the denominator in the equation of the method of the invention without band-pass filtering and with a band-pass filter applied.
Figure 8A:
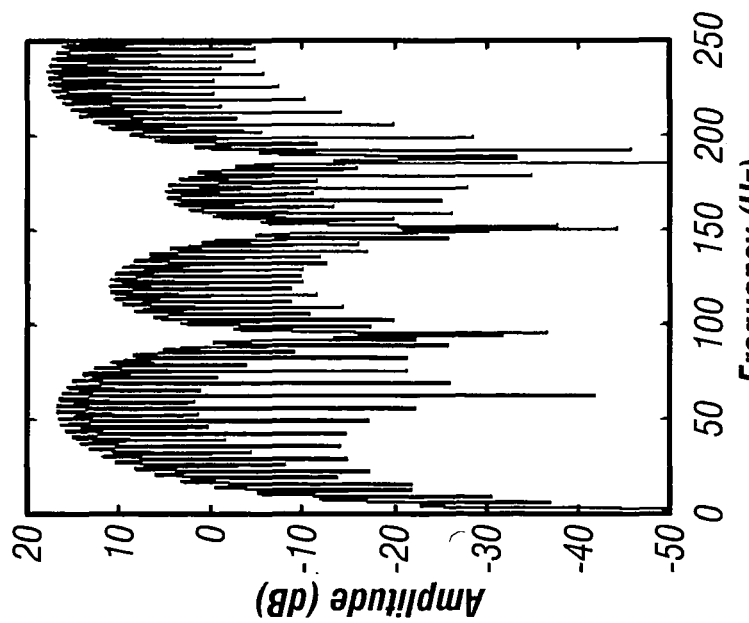

FIGS. 8A and 8B show, respectively, the spectrum of the last two terms of the denominator in the equation of the method of the invention without band-pass filtering and with a band-pass filter applied.

Figure 9:
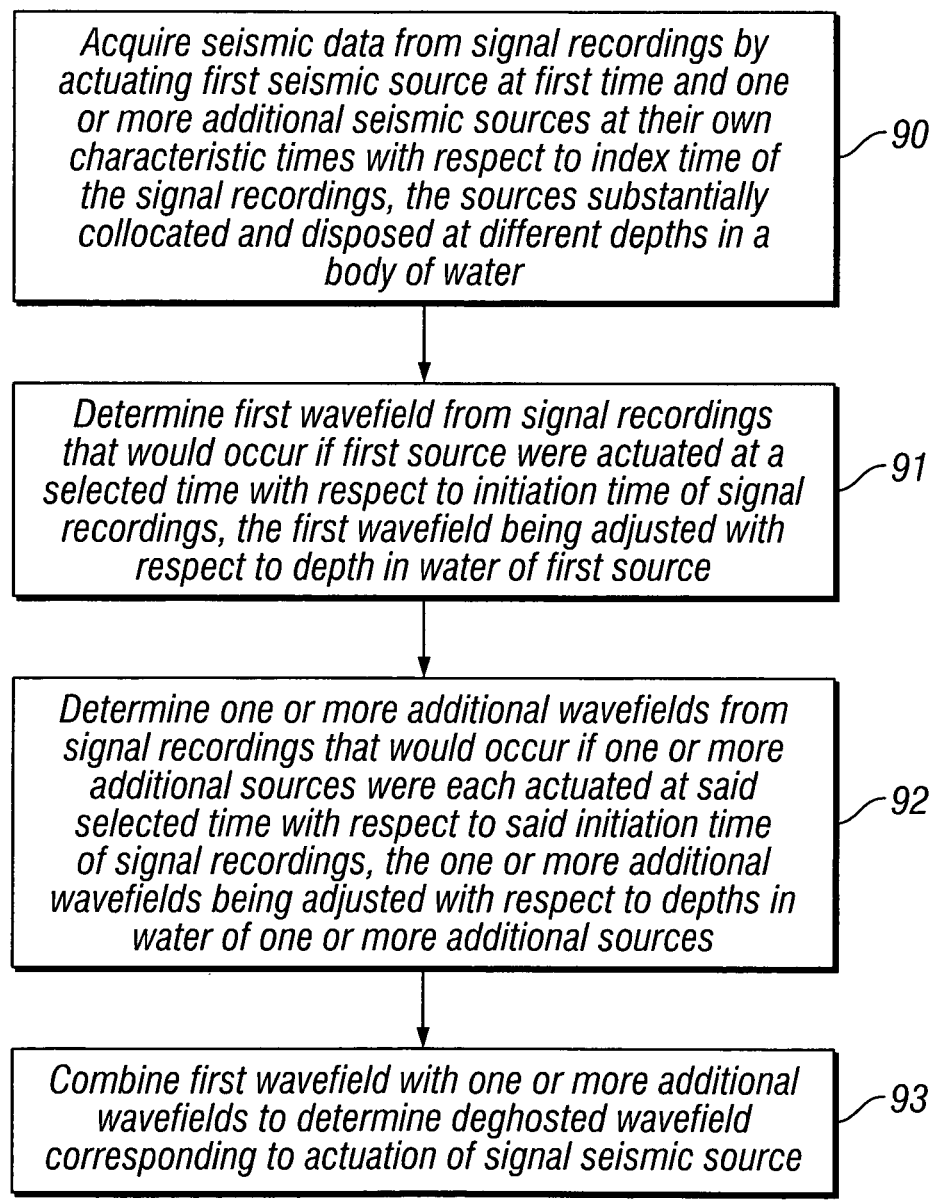
FIG. 9 shows a flowchart illustrating an embodiment of the method of the invention for determining a deghosted marine seismic energy source wavefield.

FIG. 9 shows a flowchart illustrating an embodiment of the method of the invention for determining a deghosted marine seismic energy source wavefield.

At block 90, seismic data are acquired from signal recordings by actuating a first seismic source at a first time and one or more additional seismic sources at their own characteristic times with respect to an index time of the signal recordings, the sources substantially collocated and disposed at different depths in a body of water.

At block 91, a first wavefield is determined from the signal recordings in block 90 that would occur if the first source were actuated at a selected time with respect to an initiation time of the signal recordings, the first wavefield being time adjusted with respect to the depth in the water of the first source. In one embodiment of the invention, the selected time may be the initiation time.

At block 92, one or more additional wavefields are determined from the signal recordings in block 90 that would occur if the one or more additional sources were each actuated at said selected time with respect to said initiation time of the signal recordings, the one or more additional wavefields being time adjusted with respect to the depths in the water of the one or more additional sources.

At block 93, the first wavefield from block 91 is combined with the one or more additional wavefields from block 92 to determine a deghosted wavefield corresponding to actuation of a single seismic source.

Methods according to the invention may provide improved signal amplitude in marine seismic data without the need to increase the size of the seismic energy sources used. The invention provides a technique to decompose recorded seismic signals into that which would have been recorded using only one source, while using two or more sources operated at different depths and actuated to be recorded into the same shot records.

The wavefield of marine seismic energy sources is substantially sensitive to the hydrostatic pressure, which in turn is a function of source depth. In addition, it may be desirable to use different source configurations for the different operating depths. Therefore, a correction for the source signature responses may need to be applied as shown in Equations (7) and (9). Note that such correction would be unnecessary if the individual source responses, excluding the ghosts, were specifically designed to be close to identical. There are a variety of known techniques for designing, measuring or calculating the wavefields of seismic sources, which have different levels of accuracy. The wavefield or selected positions in the wavefield can be measured directly (e.g. far-field measurement) or the wavefield can be calculated based on physical models of the source. There are also various methods of source monitoring, which determine the wavefield of the source array from shot to shot, using various sensors disposed on the seismic source array. These include the so-called Notional source method, described in Ziolkowski, A., Parkes, G., Hatton, L. and Haugland, T., [1982], *The signature of an airgun array: Computation from near-field measurements including interactions*, Geophysics, vol. 47, p. 1413-1421, and, for example, Method of Seismic Source Monitoring Using Modeled Source Signatures with Calibration Function, U.S. Pat. No. 7,218,572 issued to Parkes and commonly owned with the present invention.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. In a process for generating an image of geological structures located beneath the surface of the earth using marine seismic techniques in which at least first and second substantially collocated sources are activated in a body of water at distinct depths and at first and second times, respectively, the reflections from which activations are captured in a recording for use in generating the image, the specific improvement comprising:
   generating first and second modified versions of the recording, wherein: the first modified version is time shifted to account for a difference between the activation time of the first source and a selected time relative to the initiation of the recording, and also to account for the effect of the depth of the first source on energy arrival times in the recording; and the second modified version is time shifted to account for a difference between the activation time of the second source and the selected time relative to the initiation of the recording, and also to account for the effect of the depth of the second source on energy arrival times in the recording;
   combining the first and second modified versions of the recording to generate a new recording deghosted wavefield corresponding to that of a new single source activation at the selected time but having greater amplitude than either of the first or the second sources; and
   using the new recording deghosted wavefield in generating the image, thereby enhancing the image due to the greater amplitude of the new single source but without the necessity of actually activating a single source with such amplitude in the body of water.

2. The process of claim 1, wherein the first and second sources each comprise at least one air gun.

3. The process of claim 1, wherein the selected time is the initiation time of the recording.

4. The process of claim 1, wherein the first and second sources are disposed in different vertical planes to avoid effects of air bubbles on their respective wavefields.

5. The process of claim 4, further comprising bandpass filtering the cross-correlation functions.

6. The process of claim 1, further comprising correcting for the signatures of the first and second sources.

7. The process of claim 1, further comprising determining cross-correlation functions of ghost operators of the first and second sources.

8. The process of claim 1, wherein combining the first and second modified versions of the recording comprises:
   generating further modified recordings by multiplying each of the first and second modified versions with the complex conjugate of the ghost functions for the respective source depths; and
   adding the further modified recordings.

9. The process of claim 1, wherein the first and second sources are designed to have substantially identical ghost free signatures.

* * * * *